US008186988B2

(12) United States Patent
Baltruschat et al.

(10) Patent No.: US 8,186,988 B2
(45) Date of Patent: May 29, 2012

(54) POWDER PRESS

(75) Inventors: Udo Baltruschat, Pinneberg (DE); Stephan Mallon, Kollow (DE); Harald Römer, Reinbek (DE); Jan Naeve, Schattin (DE); Ingo Schmidt, Schwarzenbek (DE)

(73) Assignee: Fette GmbH, Schwarzenbek (DE)

( * ) Notice: Subject to any disclaimer, the term of this patent is extended or adjusted under 35 U.S.C. 154(b) by 92 days.

(21) Appl. No.: 12/492,555

(22) Filed: Jun. 26, 2009

(65) Prior Publication Data

US 2010/0028478 A1 Feb. 4, 2010

(30) Foreign Application Priority Data

Jul. 29, 2008 (DE) ........................ 10 2008 035 301

(51) Int. Cl.
*B29C 43/02* (2006.01)

(52) U.S. Cl. ........... 425/78; 425/149; 425/345; 425/355

(58) Field of Classification Search .................... 425/78, 425/138-141, 149, 344-346, 349, 354-356
See application file for complete search history.

(56) References Cited

U.S. PATENT DOCUMENTS

| | | | | |
|---|---|---|---|---|
| 3,389,432 | A | 6/1968 | Griesheimer et al. | |
| 5,378,416 | A | 1/1995 | Kishi et al. | |
| 5,670,167 | A | 9/1997 | Sleath et al. | |
| 6,013,211 | A * | 1/2000 | Seki | 425/149 |
| 7,351,048 | B2 * | 4/2008 | Hinzpeter et al. | 425/78 |
| 7,415,758 | B2 * | 8/2008 | Hauser et al. | 100/291 |

FOREIGN PATENT DOCUMENTS

| | | | |
|---|---|---|---|
| CH | 668 032 | A5 | 11/1988 |
| CN | 200939706 | * | 8/2007 |
| DE | 101 35 293 | A1 | 2/2003 |
| EP | 1516716 | | 3/2005 |
| EP | 2123435 | | 11/2009 |
| JP | 57206597 | | 12/1982 |
| JP | 62250101 | | 10/1987 |
| JP | 6-55297 | | 3/1994 |

* cited by examiner

*Primary Examiner* — Richard Crispino
*Assistant Examiner* — Thukhanh Nguyen
(74) *Attorney, Agent, or Firm* — Vidas, Arrett & Steinkraus, P.A.

(57) ABSTRACT

A powder press, with a press frame, which comprises an upper and lower frame section, an upper linear drive attached to the upper frame section and a lower linear drive attached to the lower frame section, wherein the drives are connected to an upper and lower punch plate or a die table, respectively, wherein the punch plates have a clamping system for an upper or a lower punch, a die clamping system on a die table with a die, and at least one force measuring device for measuring the pressing force on at least one punch, characterized in that at least one force measuring device is disposed between a punch plate and the associated clamping system.

5 Claims, 1 Drawing Sheet

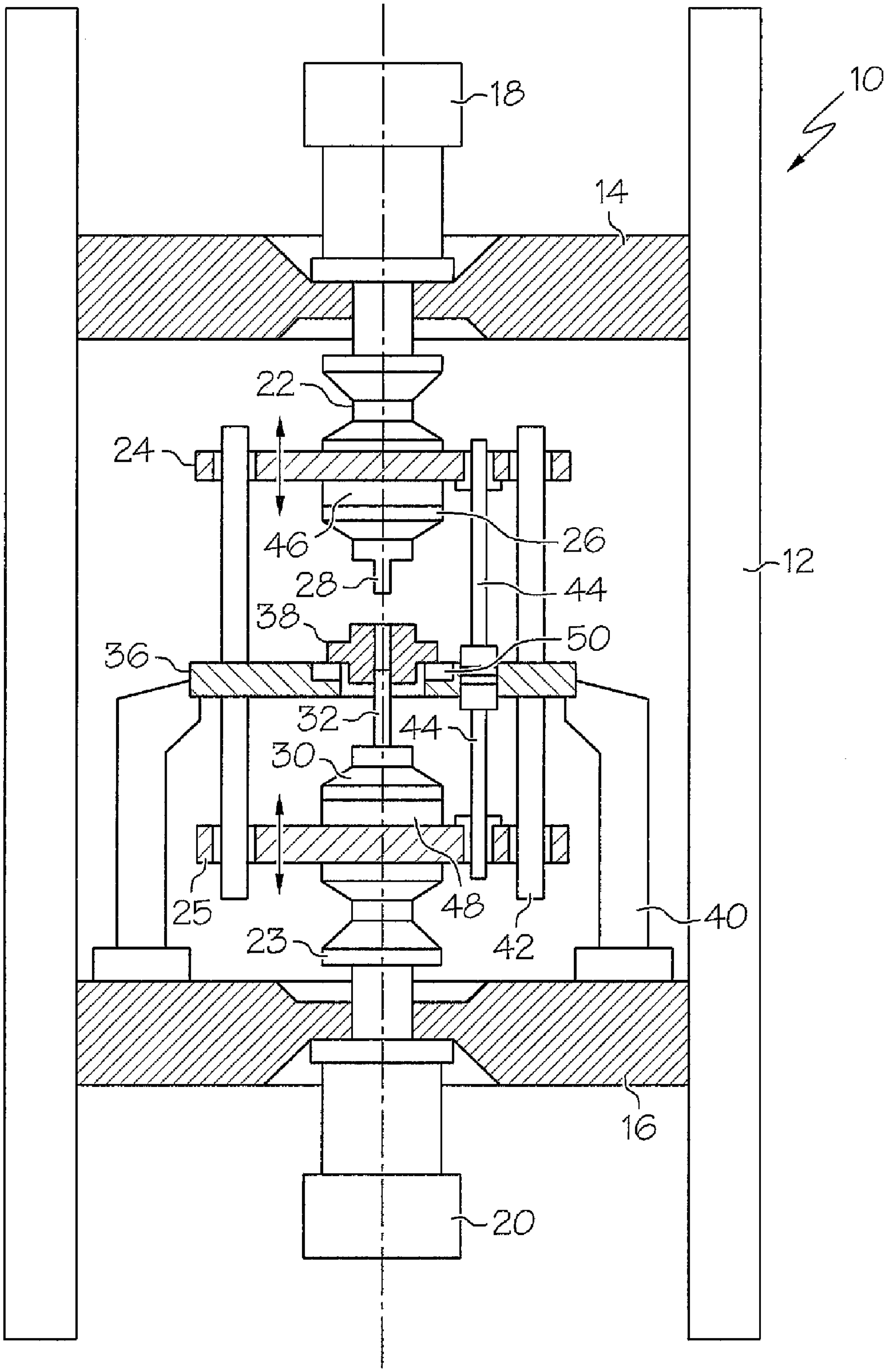
10
18
14
22
24
46
26
12
28
44
38
50
36
32
44
30
48
25
42
40
23
16
20

POWDER PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Powder presses are used, among other uses, for producing green compacts, pressed parts, before a sintering process. The typical powder press comprises an upper and a lower punch, which work together with a die on a die table, in order to compress powdered material filled into the die. The upper and lower punches are driven by a suitable drive, for example a hydraulic cylinder. The drives typically are located on transverse sections of a press frame, where in most cases a punch plate is interposed via a coupling, to which punch plate a clamping system is attached for upper and lower punches.

It is necessary to guide the upper and lower punches so that a perfect press result is attained. Furthermore, this reduces the wear on the tools. In a known implementation, the punch plate is connected to a guide carriage or part of a guide carriage that is guided vertically in the frame (adaptorless pressing). In a different implementation of a known construction, the upper and the lower punch plate is guided by guide elements that are connected to the die table. The die table, on its part, is connected to the transverse section of a press frame. The forces occurring during the pressing of the powders are transferred by the press tools via the clamping systems into the tool guide system.

Presses of the named type are distinguished according to the ejection method and the withdrawal method. In the first case, the die table is fixed to the frame, and the upper and lower punches are actuated by the drive. In the second case, the lower punch is fixed to the frame, and the die table and the upper punch plate are actuated by the drive.

It is known to measure the pressing force with which the punches impact the powder to be pressed. For this, corresponding force sensors, responding to the push and pull, are disposed between the drive and a coupling or the punch plate.

The object of the invention is to create a powder press in which also the transverse forces can be measured.

BRIEF SUMMARY OF THE INVENTION

In a powder press according to the invention at least one force measuring device is disposed between a punch plate and the associated clamping system.

In the conventional pressing force measurement, the measurement is between the drive and work tool plane, outside of the mentioned force flow. This means that, in essence, only the vertical forces on powder to be pressed are recorded, not however, the transverse forces. However, with the invention, the force measurement occurs within the tool guidance system, so that the transverse force component, if it is present, is also determined.

By determining the transverse force and decomposing this force in the magnitude and direction, it is now possible to determine the actual loadings which act on the press tool, zero point clamping system and guide system.

With the input of a limit value for the transverse force, the machine control automatically ends the press cycle (transverse pressing force switch-off) upon reaching this limit. The limit value can be determined experimentally or calculated in advance.

Alternatively, e.g., by using the known press gap width (circumferential gap between paired press punch and associated die) and the known deformation behavior of the tool guide, the maximum permissible limit value can be approximated, at which a contact of the press tool components occurs. Thereby, the press tool can be protected against premature wear or even destruction.

In the case of improper installation of the press tool in the tool guide system (tilting punch; punches not axially aligned to each other) with pairs of punches and similarly die/punch pairs, transverse forces would be visible, which can serve for tool protection.

In an embodiment of the invention, it is provided that a force measuring device is disposed between the die or the die clamping system and the die table.

The invention can be used with a powder press without an adapter or with an adapter. In the former case, a guide of the punch plates is provided by means of a guide carriage directly on the press frame, whereas in the latter case the tool guide is decoupled from the press frame.

The invention is applicable in the same manner to a press working according to the ejection method and to a press working according to the withdrawal method.

An exemplary embodiment of the invention is explained in the following in more detail using a drawing.

BRIEF DESCRIPTION OF THE VIEW OF THE DRAWING

FIG. 1 shows a powder press in an embodiment according to the invention, working according to the ejection method.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The powder press illustrated in the drawing has a frame 10 with vertical columns 12 and an upper transverse frame section 14 and a lower transverse section 16). An upper hydraulic cylinder 18 and a lower hydraulic cylinder 20 are attached to the frame sections 14, 16, respectively. The hydraulic cylinders 18, 20 act via an upper coupling 22 and, respectively, a lower coupling 23 on an upper punch plate 24 and, respectively, a lower punch plate 25. A clamping system 26 for an upper punch 28 and, respectively, a lower clamping system 30 for a lower punch 32, is attached to the punch plates 24, 25. A die table 36 with a die 38 is supported via supports 40 on the lower frame section 16. Guide columns 42 that are guided in guide bushings, not designated, of the punch plates 24, 25, are attached to the die table 36. In addition, an upper and lower measuring system 44 is disposed on the die table 36.

A force sensor 46 is disposed between the clamping system 26 and the associated punch plate 24. A force sensor 48 is disposed between the clamping system 30 and the lower punch plate 25. A further force sensor 50 is disposed between the die 38 and the die table 36.

After the die 38 is filled, upper and lower punches 28, 32 are moved into the die, driven by the hydraulic cylinders 18, 20. After the production of the compact, the upper punch 28 is pulled out, and the lower punch 32 ejects the compact from the die 36. The movement of the punch plates and the punches is indicated by the two double arrows.

Because the pressing force measurement takes place between the punch plates and the tools, it is possible to measure also the transverse forces that occur during pressing. This is in contrast to the state of the art in which only a pressing force measurement in the working direction is possible.

It should also be mentioned that the same measurement principle can also be used for a press working according to the withdrawal method. In the latter, the lower punch is stationary or fixed to the frame, and the die table is driven. This does not change the measurement of the pressing force.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed:

1. A powder press, with a press frame, which comprises an upper and lower frame section, an upper linear drive attached to the upper frame section and a lower linear drive attached to the lower frame section, wherein the drives are connected to an upper and lower punch plate or a die table, respectively, wherein the punch plates have a clamping system for an upper or a lower punch, a die clamping system on a die table with a die, and at least one force measuring device for measuring the pressing force on at least one punch, characterized in that at least one force measuring device (46, 48) is disposed between a punch plate (24, 25) and the associated clamping system (26, 30), so that in addition to vertical forces a transverse force component is also determined, if present.

2. The powder press according to claim 1, characterized in that a force measuring device (50) is disposed between the die (38) or the die clamping system and the die table (36).

3. The powder press according to claim 1, characterized by the use of a press, in which the punch plate (24, 25) is on guides (42), which are attached to the die table (36).

4. The powder press according to claim 1, characterized by the use of a press in which the punch plates are attached, respectively, to a running carriage, which is guided vertically in the guides of the press frame (10).

5. The powder press according to claim 1, characterized by the use of a press working according to the withdrawal method wherein the lower punch is fixed to the frame, and the die table and the upper punch plate are actuated by the drive.

* * * * *